(12) United States Patent
Jung et al.

(10) Patent No.: US 7,820,322 B2
(45) Date of Patent: Oct. 26, 2010

(54) BATTERY MODULE FOR MEDIUM OR LARGE SIZE BATTERY PACK

(75) Inventors: Do Yang Jung, Hwaseong-si (KR); Heekook Yang, Daejeon (KR); Yeo Won Yoon, Daejeon (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 861 days.

(21) Appl. No.: 11/452,827

(22) Filed: Jun. 14, 2006

(65) Prior Publication Data
US 2007/0015050 A1    Jan. 18, 2007

(30) Foreign Application Priority Data
Jun. 15, 2005    (KR) ............... 10-2005-0051657

(51) Int. Cl.
*H01M 2/24* (2006.01)
(52) U.S. Cl. ................... 429/157; 429/158
(58) Field of Classification Search ............ 429/157, 429/158, 159, 160
See application file for complete search history.

(56) References Cited

U.S. PATENT DOCUMENTS

| | | | |
|---|---|---|---|
| 1,095,722 A * | 5/1914 | Ford | 429/159 |
| 3,972,736 A * | 8/1976 | Tsygankov et al. | 429/159 |
| 5,593,793 A | 1/1997 | German | |
| 6,275,003 B1 | 8/2001 | Marukawa et al. | |
| 6,368,743 B1 * | 4/2002 | Guerin et al. | 429/159 |
| 6,475,659 B1 * | 11/2002 | Heimer | 429/159 X |
| 6,569,561 B1 | 5/2003 | Kimura et al. | |
| 6,773,848 B1 * | 8/2004 | Nortoft et al. | 429/158 |
| 6,899,975 B2 * | 5/2005 | Watanabe et al. | 429/156 |
| 2003/0170535 A1 | 9/2003 | Watanabe et al. | 429/158 |
| 2004/0058233 A1 | 3/2004 | Hamada et al. | |

FOREIGN PATENT DOCUMENTS

| | | |
|---|---|---|
| DE | 10110415 A1 | 9/2001 |
| JP | 2004-031049 | 1/2004 |
| JP | 2004-247320 | 9/2004 |
| KR | 10-2005-0036751 A | 4/2005 |

OTHER PUBLICATIONS

International Search Report of International Application No. PCT/KR2006/002144 dated Sep. 29, 2006.

* cited by examiner

*Primary Examiner*—Stephen J. Kalafut
(74) *Attorney, Agent, or Firm*—Cantor Colburn LLP

(57) ABSTRACT

Disclosed herein is a battery module for medium- or large-sized battery packs, including a plurality of unit cells, wherein the unit cells are generally plate-shaped unit cells, and the unit cells are electrically connected with each other while the unit cells are arranged in a module case so as to constitute at least two rows and at least two columns. According to the present invention, integration of the battery module is highly improved. Especially, the vertical-direction mechanical strength of the battery module is further increased, and the number of connecting members necessary for the electrical connection between the unit cells is reduced.

20 Claims, 3 Drawing Sheets

BATTERY MODULE FOR MEDIUM OR LARGE SIZE BATTERY PACK

FIELD OF THE INVENTION

The present invention relates to a battery module for medium- or large-sized battery packs, and, more particularly, to a battery module for medium- or large-sized battery packs, including a plurality of unit cells, wherein the unit cells are generally plate-shaped unit cells, and the unit cells are electrically connected with each other while the unit cells are arranged in a module case so as to constitute at least two rows and at least two columns, whereby integration and the mechanical strength of the battery module are increased, and the number of connecting members necessary for the electrical connection between the unit cells is reduced, and a medium- or large-sized battery pack manufactured with the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery pack having a plurality of battery cells electrically connected with each other because high output and large capacity are necessary for the medium- or large-sized devices.

Unit cells used for medium- or large-sized battery packs are classified approximately into a cylindrical battery, a rectangular battery, and a pouch-shaped battery. For early medium- or large-sized battery packs, the cylindrical battery was used as a unit cell. For example, Japanese Unexamined Patent Publication No. 2004-247320 discloses a method of manufacturing a battery pack by connecting cylindrical batteries with each other in the horizontal direction, while the cylindrical batteries are mounted to a fixing plate having a specific shape, and connecting the cylindrical batteries with each other in the vertical direction using connection rings and insulation rings. However, the above-mentioned publication has problems in that the connection between the plurality of cylindrical batteries so as to manufacture the battery pack requires a large number of connecting members due to the structural characteristics of the cylindrical batteries, and therefore, the assembly process of the battery pack is complicated, which greatly increases the manufacturing costs of the battery pack. Furthermore, there exist a large number of dead spaces between the cylindrical batteries. For this reason, the cylindrical batteries have fundamental limits in consideration of the recent demand of battery packs having a compact structure.

Consequently, there has been carried out much research on plate-shaped batteries, such as a rectangular battery and a pouch-shaped battery, which can be easily assembled with a reduced number of connecting members and can be stacked with high density. Especially, a high interest is taken in the pouch-shaped battery, which is lightweight and can be manufactured with low manufacturing costs.

The plate-shaped battery has an advantage in that the battery pack can be easily manufactured using a few number of connecting members, while the size of the dead space is greatly reduced, due to the structural characteristics of the plate-shaped battery. However, the plate-shaped battery, especially, the pouch-shaped battery, has low mechanical strength. For these reasons, for example, one to five batteries are mounted in a case having adequate mechanical strength, or the batteries are connected by additional members, so as to constitute a battery module, and a plurality of battery modules are stacked one on another based on desired capacity and output, so as to manufacture a battery pack.

Typical examples of such battery packs are disclosed in Korean Unexamined Patent Publication No. 2005-0036751, which has been filed in the name of the applicant of the present patent application, Japanese Unexamined Patent Publication No. 2004-31049, Japanese Unexamined Patent Publication No. 2004-247320, and U.S. Unexamined Patent Publication No. 2003-170535. These publications have their own advantages in constructing the battery packs using the plate-shaped batteries as unit cells. According to the disclosures of the publications, the plate-shaped unit cells are mechanically and electrically connected with each other, while the unit cells are arranged in the vertical or horizontal direction, so as to constitute a battery module, and a plurality of battery modules are also arranged in the horizontal or vertical direction so as to constitute a medium- or large-sized battery pack.

However, when the plate-shaped batteries are arranged only in the horizontal direction, i.e., in the lateral direction of the plate-shaped batteries, so as to constitute the battery module, the battery module is formed in a thin plate-shaped structure. As a result, the mechanical strength of the battery module is low, and a large number of members (for example, bus bars) are necessary for the electrical connection between electrode terminals of the plate-shaped batteries. On the other hand, when the plate-shaped batteries are arranged only in the vertical direction, i.e., in the thickness direction of the plate-shaped batteries, the horizontal-direction mechanical coupling between battery modules is additionally required to constitute the battery pack. As a result, the assembly process of the battery pack is complicated.

Consequently, the necessity of a battery module, which can be easily manufactured, has sufficient mechanical strength, and allows more efficient manufacture of a battery pack, is highly requested.

SUMMARY OF THE INVENTION

Therefore, the present invention has been made to solve the above problems, and other technical problems that have yet to be resolved.

Specifically, it is an object of the present invention to provide a battery module, which has high structural integration and high mechanical strength, and minimizes the use of additional connecting members for the electrical connection between unit cells of the battery module.

It is another object of the present invention to provide a battery pack including a plurality of battery modules, each of which has high structural integration and high mechanical strength, the battery pack being used in a high-output, large-capacity battery system.

In accordance with one aspect of the present invention, the above and other objects can be accomplished by the provision of a battery module for medium- or large-sized battery packs, comprising a plurality of unit cells, wherein the unit cells are generally plate-shaped unit cells, and the unit cells are electrically connected with each other while the unit cells are arranged in a module case so as to constitute at least two rows and at least two columns.

In the battery module according to the present invention, the plurality of unit cells are arranged in the module case at least in a 2×2 matrix. As a result, the battery module has predetermined thicknesses in the horizontal and vertical directions. Consequently, the whole mechanical strength of the battery module is increased, and the number of members necessary for the electrical connection between the unit cells is reduced.

In the present invention, the term "column" means the thickness direction of the plate-shaped battery, and, sometimes, the term "column" is expressed as the "vertical direction." On the other hand, the term "row" means the lateral direction of the plate-shaped battery, and, sometimes, the term "row: is expressed as the "horizontal direction." Consequently, when four plate-shaped batteries are successively arranged on the plane as in the conventional art, the four plate-shaped batteries are arranged on the plane so as to constitute one row and four columns, which is expressed by a 1×4 matrix.

According to the present invention, the plate-shaped unit cells are arranged in the module case so as to constitute two or more rows and two or more columns. Consequently, the unit cells may be arranged in a 2×2 matrix, in a 2×3 matrix, in a 2×4 matrix, in a 2×5 matrix, in a 3×2 matrix, in a 3×3 matrix, etc. More preferably, the unit cells are arranged in a 2×2 matrix, in a 2×3 matrix, or in a 3×2 matrix.

The plate-shaped batteries have large width and small thickness. Consequently, for example, when the unit cells of the battery module are arranged in a 1×4 matrix as in the conventional art, the horizontal-direction length (the width) of the battery module corresponds to the sum of the widths of four unit cells, and the vertical-direction length (the thickness) of the battery module corresponds to the thickness of one unit cells. As a result, the battery module has large width and small thickness, i.e., the battery module is constructed in a thin structure, and therefore, the mechanical strength of the battery module is decreased. According to the present invention, on the other hand, the thickness of the battery module corresponds to the sum of the thicknesses of at least two unit cells or more. Consequently, the mechanical strength of the battery module is increased.

According to the present invention, plate-shaped batteries are used as the unit cells. Typical examples of the plate-shaped batteries may be rectangular batteries and pouch-shaped batteries. These batteries are constructed in a structure in which an electrode assembly, which can be charged and discharged, is mounted in a rectangular case or a pouch-shaped case in a sealed state. The electrode assembly is constructed in a stack type structure or in a jelly-roll type structure, in which minute porous separators are disposed between corresponding cathodes and anodes. More preferably, the pouch-shaped battery, which is lightweight, inexpensive, and has low possibility of leakage of an electrolyte, is used as the plate-shaped battery.

In the plate-shaped battery, electrode terminals may protrude generally from one side of a battery cell of the plate-shaped battery. Alternatively, the electrode terminals may protrude from two difference sides of the battery cell, such as the upper and lower ends of the battery cell or the right and left sides of the battery cell. For example, the electrode terminals of the pouch-shaped battery may be electrode taps, which protrude from the electrode assembly and are exposed to the outside of a battery case of the plate-shaped battery, or electrode leads, which are connected to the electrode taps and are exposed to the outside of the battery case of the plate-shaped battery.

The module case according to the present invention is not particularly restricted so long as the unit cells can be coupled to the module case as one unit. For example, the module case may be constructed in a cartridge structure disclosed in Korean Unexamined Patent Publication No. 2005-0036751, which has been filed in the name of the applicant of the present patent application. The disclosure of the above-mentioned publication is hereby incorporated by reference as if fully set forth herein. However, the module case according to the present invention is different from the cartridge disclosed in the publication in that the unit cells are arranged in the battery module at least in a 2×2 matrix, and therefore, the thickness of the module case is twice or more greater than that of the cartridge disclosed in the publication. Furthermore, the module case according to the present invention serves to couple the unit cells as one unit. Consequently, only some of the unit cells may be connected to the module case so as to accomplish the mechanical coupling between the unit cells and the module case.

In the battery module according to the present invention, the electrical connection between the unit cells may be variously accomplished depending upon the series connection and/or the parallel connection of the unit cells. When the unit cells are arranged in the horizontal direction, the unit cells have large spacing distance between the electrode terminals, and therefore, the electrical connection between the unit cells may be accomplished using connecting members, for example, bus bars or a printed circuit board (PCB). The connection may be accomplished in various manners, such as welding, soldering, and mechanical coupling. Even when the unit cells are arranged in the vertical direction, the above-mentioned connecting members and the above-mentioned electrical connection may be applied to the unit cells. In the latter case, however, the unit cells have small spacing distance between the electrode terminals, and therefore, when the unit cells are the pouch-shaped batteries, the electrode taps or the electrode leads, which serve as the electrode terminals, are bent to be brought into contact with each other, and then the contacts parts of the electrode taps or the electrode leads are securely fixed to each other by welding, soldering, or mechanical coupling, whereby the electrical connection between the unit cells is accomplished. Consequently, the number of connecting members necessary for the electrical connection of the battery module is greatly reduced.

In the above description, the connection using the PCB means the electrical connection accomplished by welding, soldering, or mechanically coupling the electrode terminals of the unit cells to the PCB, on which connection circuits for the electrode terminals of the unit cells are printed, at the same time.

In accordance with another aspect of the present invention, there is provided a medium- or large-sized battery pack including two or more of the above-described battery modules.

The battery modules are constructed generally in a rectangular structure, and therefore, the battery modules can be stacked with high density so as to constitute the medium- or large-sized battery pack. The battery pack according to the present invention is manufactured by deciding the number of the battery modules based on desired capacity and output, arranging the battery modules, and electrically connecting the battery modules. The arrangement of the battery modules is not particularly restricted. For example, the battery modules may be arranged in a 1×N matrix, in an N×1 matrix, or in an Na×Nb matrix (where, N, Na, and Nb are each independently 2 or more). Preferably, the battery modules are arranged in an N×1 matrix or in an Na×Nb matrix (where, Na<Nb), which increases the spatial use of the battery pack.

The battery modules may be electrically connected in the battery pack in various manners. For example, when the battery modules are arranged in an N×1 matrix or in an Na×Nb matrix, the vertical-direction battery modules may be arranged in the same orientation structure in which the same electrode terminals of the battery modules are adjacent to each other, or the vertical-direction battery modules may be arranged in an alternating orientation structure in which reverse electrode terminals of the battery modules are adjacent to each other. When the battery modules are connected in series with each other in the same orientation structure, connecting members, such as bus bars, are connected between the electrode terminals while the connecting members diagonally cross between the battery modules. When the battery modules are connected in series with each other in the alternating orientation structure, the connecting members are connected between the electrode terminals while the connecting members vertically cross between the battery modules.

On the other hand, when the battery modules are connected in series with each other in the horizontal direction in an 1×N matrix or in an Na×Nb matrix, the electrode terminals of the battery modules are connected with each other using the connecting members, such as the bus bars, while the battery modules are oriented such that the reverse electrode terminals of the battery modules are adjacent to each other.

The battery modules may be arranged and oriented in other various structures, which must be interpreted to fall into the category of the present invention.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
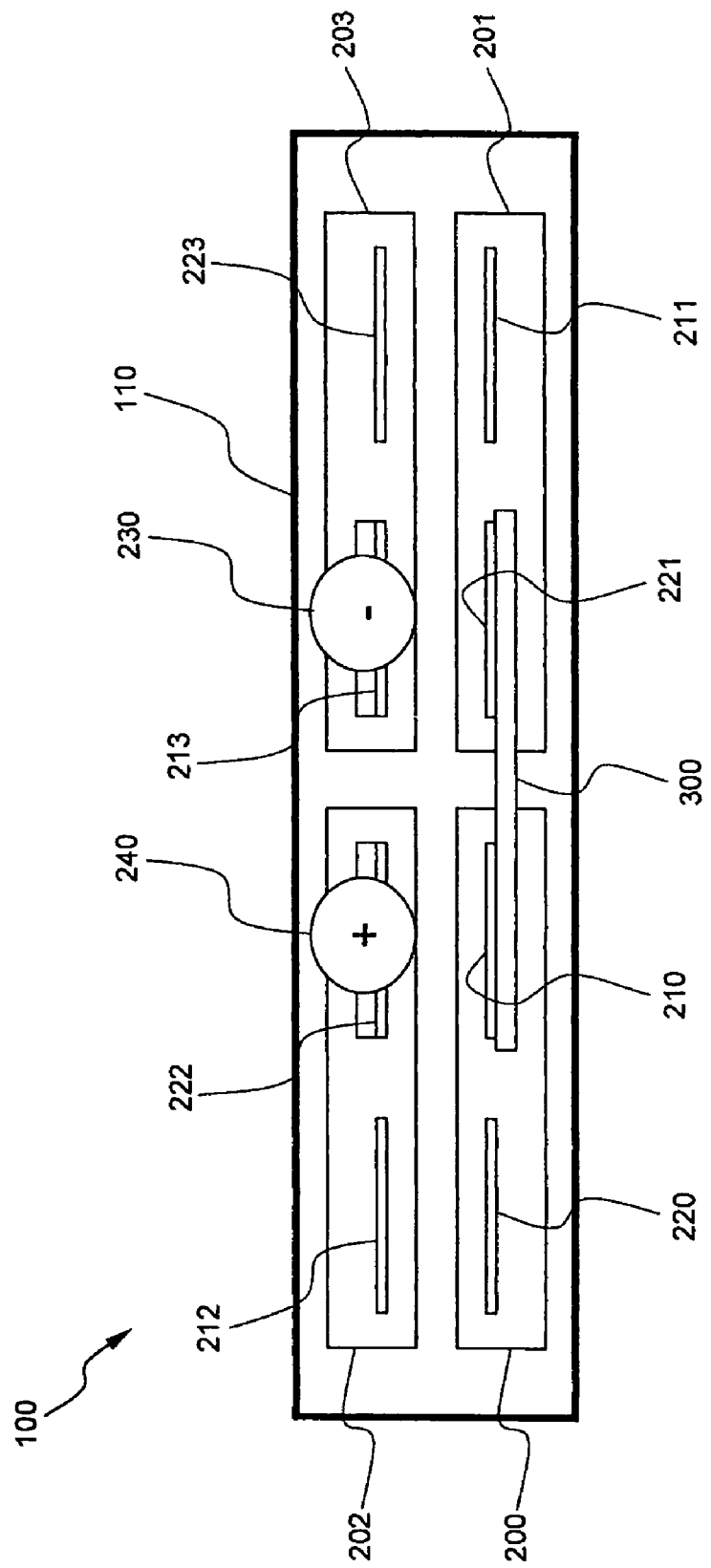
FIG. 1 is a typical view illustrating a battery module according to a preferred embodiment of the present invention.

FIG. 1 is a typical view illustrating a battery module according to a preferred embodiment of the present invention. The arrangement of unit cells, which constitute the battery module, and the electrical connection between the unit cells are clearly shown in FIG. 1.

Referring to FIG. 1, the battery module 100 is constructed in a structure in which four unit cells 200, 201, 202 and 203 are mounted in a module case 110. The first unit cell 200 and the second unit cell 201 are arranged in the horizontal direction. The first unit cell 200 and the third unit cell 202 are arranged in the vertical direction, and the second unit cell 201 and the fourth unit cell 203 are also arranged in the vertical direction. In other words, the four unit cells 200, 201, 202, and 203 are arranged in a 2×2 matrix so as to construct the one-unit battery module 100. Consequently, the vertical length (the thickness) of the battery module 100 is greater than at least the sum of the thicknesses of the two unit cells. The battery module having the above-defined thickness provides higher mechanical strength than another battery module constructed in a structure in which the unit cells 200, 201, 202, and 203 are arranged only in the horizontal direction, i.e., in a 1×4 matrix.

In the battery module 100 shown in FIG. 1, the unit cells 200, 201, 202, and 203 are electrically connected with each other in a series-connection structure. Specifically, an anode terminal 210 of the first unit cell 200 is connected to a cathode terminal 221 of the second unit cell 201 via a bus bar 300.

When the unit cells 200, 201, 202, and 203 are pouch-shaped batteries, and therefore, electrode taps or electrode leads of each pouch-shaped battery protrude outward from the outer surface of a battery cell, on the other hand, the electrical connection between the first unit cell 200 and the third unit cell 202 and the electrical connection between the second unit cell 201 and the fourth unit cell 203 may be accomplished without using additional bus bars.

For example, when the first unit cell 200 and the third unit cell 202 are arranged in the vertical direction such that the upper surface of the first unit cell 200 faces the lower surface of the third unit cell 202, and the first unit cell 200 and the third unit cell 202 are arranged in an alternating orientation structure such that a cathode terminal 220 of the first unit cell 200 is adjacent to an anode terminal 212 of the third unit cell 202, as shown in FIG. 1, it is possible that the electrode terminals 220 and 212 are bought into direct contact with each other by bending the electrode terminals 220 and 212. The contact regions of the electrode terminals 220 and 212 may be securely fixed to each other by welding, soldering, or mechanical coupling, whereby the electrical connection between the electrode terminals 220 and 212 is maintained. This is also applied to the electrical connection between an anode terminal 211 of the second unit cell 201 and a cathode terminal 223 of the fourth unit cell 203 in the same manner. Consequently, the number of bus bars 300 used is greatly reduced.

On the other hand, a cathode terminal 222 of the third unit cell 202 and an anode 213 of the fourth unit cell 203 are connected to external input and output terminals 240 and 230, respectively.

Figure 2:
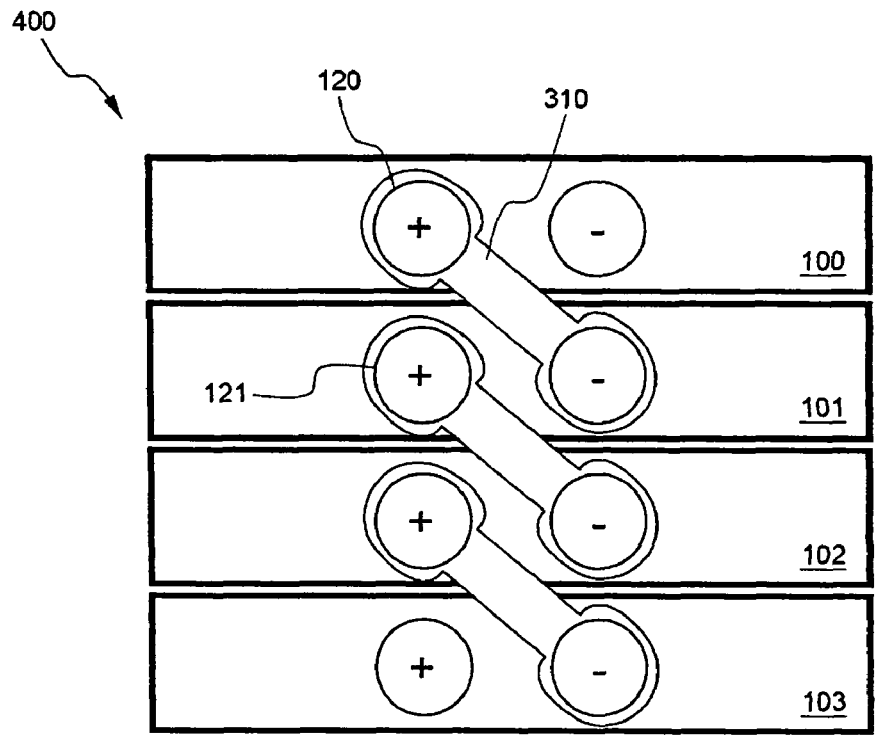
FIG. 2 is a typical view illustrating a battery pack according to a preferred embodiment of the present invention, the battery pack including a plurality of battery modules, one of which is shown in FIG. 1, arranged in the same orientation structure.

FIG. 2 is a typical view illustrating a medium- or large-sized battery pack according to a preferred embodiment of the present invention.

Referring to FIG. 2, the battery pack 400 is constructed in a structure in which four battery modules 100, 101, 102, 104, one of which is shown in FIG. 1, are arranged in the vertical direction, i.e., in a 4×1 matrix. The respective battery modules 100, 101, 102, and 103 are stacked one on another in the same orientation structure such that the same electrode terminals of the battery modules are adjacent to each other. Specifically, a cathode terminal 120 of the first battery module 100 is adjacent to a cathode 121 of the second battery module 101. Consequently, when the battery modules 100, 101, 102, and 103 are connected in series with each other, bus bars 310 are connected between reverse electrode terminals while the bus bars 310 diagonally cross between the battery modules 100, 101, 102, and 103.

Figure 3:
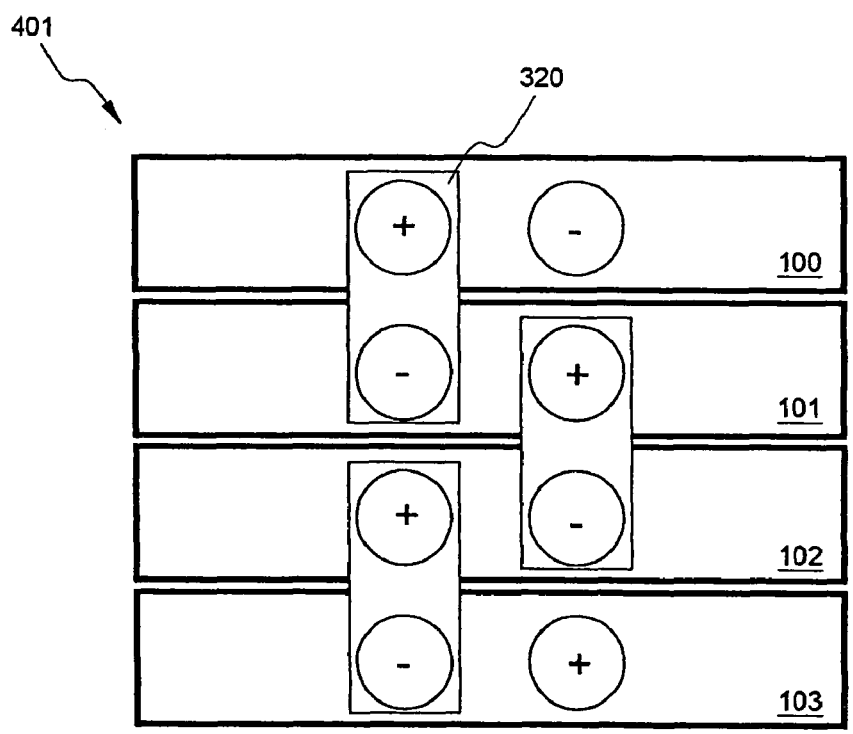
FIG. 3 is a typical view illustrating a battery pack according to another preferred embodiment of the present invention, the battery pack including a plurality of battery modules, one of which is shown in FIG. 1, arranged in an alternating orientation structure.

FIG. 3 is a typical view illustrating a modification of the battery pack shown in FIG. 2, wherein the battery modules of the battery pack are arranged in an alternating orientation structure.

Referring to FIG. 3, the battery pack 401 is identical to the battery pack 400 shown in FIG. 2 in that battery modules 100, 101, 102, and 103 of the battery pack are arranged in a 4×1 matrix; however, the battery pack 401 is different from the battery pack 400 in that the battery modules are arranged in the alternating orientation structure in which the reverse electrode terminals are adjacent to each other. Consequently, bus bars 320 vertically cross between the respective battery modules 100, 101, 102, and 103 such that the bus bars 320 are connected between the corresponding electrode terminals.

Figure 4:
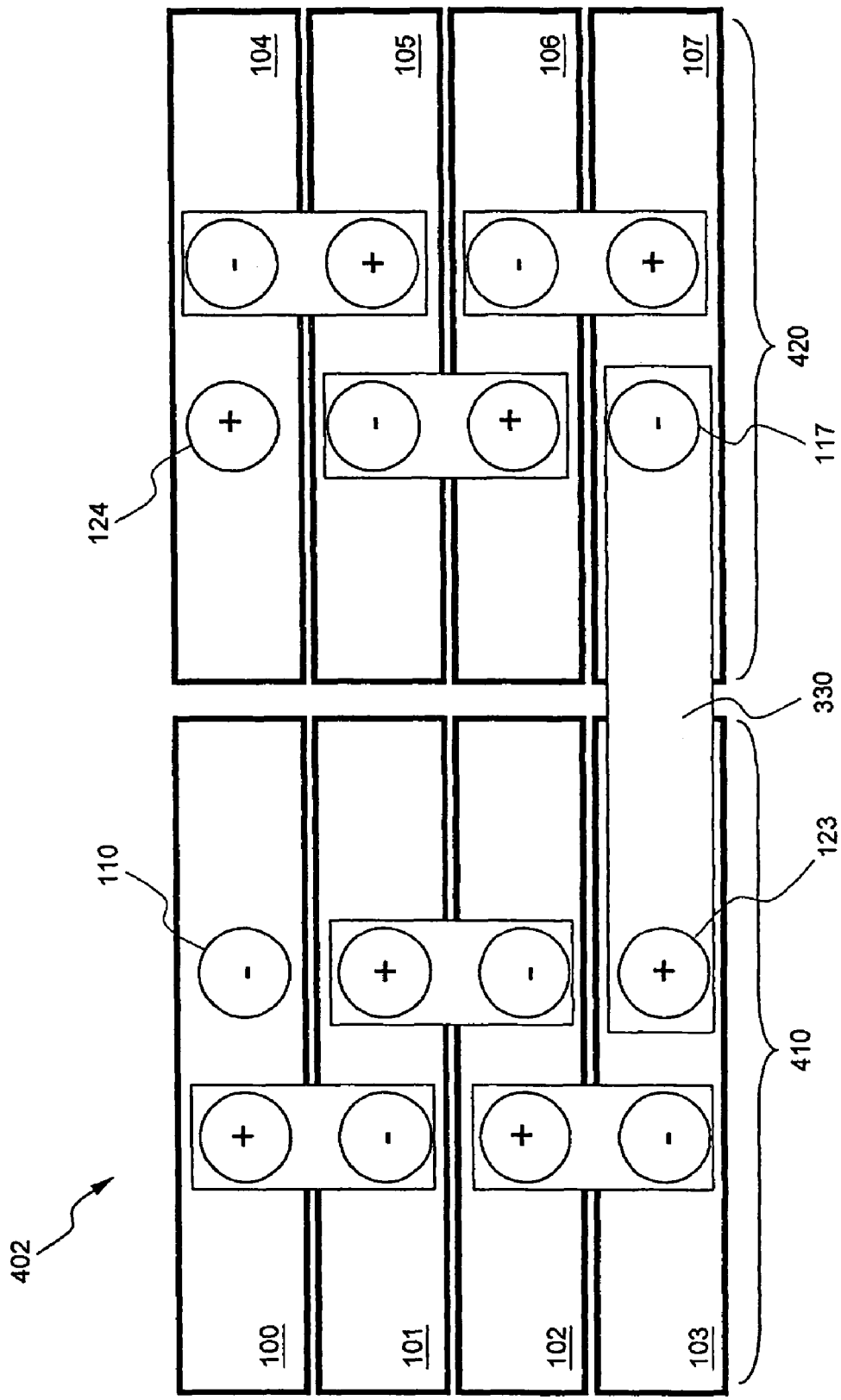
FIG. 4 is a typical view illustrating a battery pack according to yet another preferred embodiment of the present invention.

FIG. 4 is a typical view illustrating a battery pack according to another preferred embodiment of the present invention.

Referring to FIG. 4, the battery pack 402 comprises eight battery modules, which are arranged in a 4×2 matrix. Specifically, four battery modules 100, 101, 102, and 103 are arranged in the vertical direction so as to constitute a first column 410, and four battery modules 104, 105, 106, and 107 are also arranged in the vertical direction so as to constitute a second column 420. The first and second columns 410 and 420 are arranged in the horizontal direction so as to constitute a single row. The battery modules 100, 101, 102, and 103 of the first column 410 are arranged in the same alternating orientation structure as in FIG. 3, and the battery modules 104, 105, 106, and 107 of the second column 420 are also arranged in the same alternating orientation structure as in FIG. 3, whereby the same electrical connection as in FIG. 3 is accomplished.

Meanwhile, the electrical connection between the first column 410 and the second column 420 is accomplished by connecting a cathode terminal 123 of the fourth battery module 103 belonging to the first column 410 and an anode terminal 117 of the eighth battery module 107 belonging to the second column 420 with each other using a bus bar 330. An anode terminal 110 of the first battery module 100 and a cathode terminal 124 of the fifth battery module 104 are connected to external input and output terminals (not shown) of the battery pack 402.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention is constructed in a structure in which plate-shaped unit cells are mounted in a case of the battery module while the unit cells are arranged in the vertical and horizontal directions, i.e., in a matrix pattern. Consequently, integration of the battery module is highly improved. Especially, the vertical-direction mechanical strength of the battery module is further increased, and the number of connecting members necessary for the electrical connection between the unit cells is reduced.

What is claimed is:

1. A battery module for battery packs, comprising a plurality of unit cells, wherein
    the unit cells are generally plate-shaped unit cells, and
    the unit cells are electrically connected with each other while the unit cells are arranged in a module case so as to constitute at least two rows and at least two columns, and wherein
    the unit cells arranged in a row direction are electrically connected with each other via at least one connecting member,
    the unit cells arranged in a column direction are electrically connected with each other by bending electrode taps or electrode leads of the unit cells, and
    at least two unit cells of the unit cells are constructed in a structure that one terminal is electrically connected to a unit cell arranged in a row direction via the connecting member and the other terminal is electrically connected to a unit cell arranged in a column direction by bending electrode taps or electrode leads.

2. The battery module according to claim 1, wherein the unit cells are arranged in a 2×2 matrix, in a 2×3 matrix, or in a 3×2 matrix.

3. The battery module according to claim 1, wherein the plate-shaped unit cells are pouch-shaped batteries.

4. The battery module according to claim 3, wherein electrode taps or electrode leads of the unit cells serve as electrode terminals of the pouch-shaped batteries, and the bent electrode taps or the bent electrode leads of the pouch-shaped batteries electrically contact without using at least one additional connecting member.

5. A battery pack including two or more battery modules according to claim 1.

6. The battery pack according to claim 5, wherein the battery modules are arranged in columns and rows in a 1×N matrix, in an N×1 matrix, or in an Na×Nb matrix, respectively (where, N, Na, and Nb are each independently 2 or more).

7. The battery pack according to claim 6, wherein the battery modules are arranged in an N×1 matrix or in an Na×Nb matrix (where, Na<Nb).

8. The battery pack according to claim 7, wherein
    the battery modules arranged in a column direction are arranged in a same orientation structure in which the same electrode terminals of the battery modules are adjacent to each other, or
    the battery modules arranged in a column direction are arranged in an alternating orientation structure in which reverse electrode terminals of the battery modules are adjacent to each other.

9. A battery pack including two or more battery modules according to claim 2.

10. A battery pack including two or more battery modules according to claim 3.

11. A battery pack including two or more battery modules according to claim 4.

12. The battery pack according to claim 9, wherein the battery modules are arranged in columns and rows in a 1×N matrix, in an N×1 matrix, or in an Na×Nb matrix, respectively (where, N, Na, and Nb are each independently 2 or more).

13. The battery pack according to claim 10, wherein the battery modules are arranged in columns and rows in a 1×N matrix, in an N×1 matrix, or in an Na×Nb matrix, respectively (where, N, Na, and Nb are each independently 2 or more).

14. The battery pack according to claim 11, wherein the battery modules are arranged in columns and rows in a 1×N matrix, in an N×1 matrix, or in an Na×Nb matrix, respectively (where, N, Na, and Nb are each independently 2 or more).

15. The battery pack according to claim 12, wherein the battery modules are arranged in an N×1 matrix or in an Na×Nb matrix (where, Na<Nb).

16. The battery pack according to claim 13, wherein the battery modules are arranged in an N×1 matrix or in an Na×Nb matrix (where, Na<Nb).

17. The battery pack according to claim 14, wherein the battery modules are arranged in an N×1 matrix or in an Na×Nb matrix (where, Na<Nb).

18. The battery pack according to claim 15, wherein the battery modules arranged in a column direction are arranged in a same orientation structure in which the same electrode terminals of the battery modules are adjacent to each other, or the battery modules arranged in a column direction are arranged in an alternating orientation structure in which reverse electrode terminals of the battery modules are adjacent to each other.

19. The battery pack according to claim 16, wherein the battery modules arranged in a column direction are arranged in a same orientation structure in which the same electrode terminals of the battery modules are adjacent to each other, or the battery modules arranged in a column direction are arranged in an alternating orientation structure in which reverse electrode terminals of the battery modules are adjacent to each other.

20. The battery pack according to claim 17, wherein the battery modules arranged in a column direction are arranged in a same orientation structure in which the same electrode terminals of the battery modules are adjacent to each other, or the battery modules arranged in a column direction are arranged in an alternating orientation structure in which reverse electrode terminals of the battery modules are adjacent to each other.

* * * * *